(12) United States Patent
Takikawa et al.

(10) Patent No.: US 8,801,524 B2
(45) Date of Patent: Aug. 12, 2014

(54) DAMPER APPARATUS

(75) Inventors: Yoshihiro Takikawa, Tsushima (JP); Yoichi Oi, Anjo (JP); Kazuto Maruyama, Nishio (JP); Kazuhiro Itou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/431,421

(22) Filed: Mar. 27, 2012

(65) Prior Publication Data
US 2012/0252587 A1      Oct. 4, 2012

(30) Foreign Application Priority Data

Mar. 28, 2011   (JP) .................... 2011-070505

(51) Int. Cl.
*F16F 15/121*      (2006.01)
(52) U.S. Cl.
USPC .................................. 464/68.9; 464/67.1
(58) Field of Classification Search
USPC ............... 464/67.1, 68.1, 68.7, 68.8, 68.9; 192/3.29, 213, 213.2
See application file for complete search history.

(56) References Cited

U.S. PATENT DOCUMENTS

| | | | |
|---|---|---|---|
| 4,347,717 A | 9/1982 | Lamarche | |
| 4,422,535 A | 12/1983 | Ling | |
| 4,693,348 A | 9/1987 | Tsukamoto et al. | |
| 4,702,721 A | 10/1987 | Lamarche | |
| 4,987,980 A * | 1/1991 | Fujimoto | 192/213.2 X |
| 5,080,215 A | 1/1992 | Forster et al. | |
| 5,149,303 A | 9/1992 | Koshimo | |
| 5,246,399 A | 9/1993 | Yanko et al. | |
| 5,772,515 A * | 6/1998 | Yamakawa et al. | 192/3.29 X |
| 5,868,228 A | 2/1999 | Fukushima | |
| 5,885,160 A | 3/1999 | Tauvron | |
| 6,051,901 A | 4/2000 | Ishida | |
| 6,209,701 B1 | 4/2001 | Hashimoto et al. | |
| 6,257,383 B1 * | 7/2001 | Ohkubo et al. | 192/3.29 |

(Continued)

FOREIGN PATENT DOCUMENTS

| | | |
|---|---|---|
| DE | 10 2007 05743 A1 | 6/2009 |
| EP | 2 642 162 A1 | 9/2013 |

(Continued)

OTHER PUBLICATIONS

Apr. 24, 2012 Search Report issued in PCT/JP2012/057446 (with translation).

(Continued)

*Primary Examiner* — Gregory Binda
*Assistant Examiner* — Matthieu Setliff
(74) *Attorney, Agent, or Firm* — Oliff PLC

(57) ABSTRACT

In a damper apparatus, power is transferred, in order, from a motor, to an input, to a first elastic body, to a first element, to a second elastic body, to a second element, to a third elastic body, and to an output. The first and second elastic bodies are disposed radially outward of the third elastic body, and adjacent to each other on a single circumference. The first element has an annular outer peripheral portion that surrounds the first and second elastic bodies, and a pair of contact portions that are formed on peripheral edges on respective sides of the outer peripheral portion to protrude from the peripheral edges radially inward and to face each other, and that are between and in contact with the first elastic body and the second elastic body.

12 Claims, 9 Drawing Sheets

(56) References Cited

U.S. PATENT DOCUMENTS

| | | | |
|---|---|---|---|
| 6,306,043 B1* | 10/2001 | Annic et al. | 464/68.8 |
| 7,207,888 B2* | 4/2007 | Verhoog et al. | 464/67.1 |
| 8,047,921 B2* | 11/2011 | Kombowski | 464/68.8 |
| 8,313,385 B2* | 11/2012 | Mundt et al. | 464/68.8 |
| 2003/0032487 A1* | 2/2003 | Verhoog et al. | 192/3.29 X |
| 2003/0100376 A1 | 5/2003 | Friedmann et al. | |
| 2006/0000682 A1 | 1/2006 | Yamamoto et al. | |
| 2009/0139819 A1 | 6/2009 | Jameson et al. | |
| 2009/0152066 A1 | 6/2009 | Degler et al. | |
| 2009/0183962 A1 | 7/2009 | Nakamura | |
| 2010/0032259 A1 | 2/2010 | Saeki et al. | |
| 2010/0133063 A1* | 6/2010 | Degler | |
| 2011/0240432 A1* | 10/2011 | Takikawa et al. | 192/3.29 |
| 2012/0048057 A1* | 3/2012 | Fafet et al. | |
| 2012/0088589 A1* | 4/2012 | Verhoog | 464/67.1 |
| 2012/0208646 A1* | 8/2012 | Takikawa et al. | 464/68.8 |
| 2012/0208647 A1* | 8/2012 | Takikawa et al. | 464/68.8 |
| 2012/0208648 A1* | 8/2012 | Takikawa et al. | 464/68.8 |
| 2012/0252586 A1* | 10/2012 | Takikawa et al. | 464/68.8 |

FOREIGN PATENT DOCUMENTS

| | | |
|---|---|---|
| FR | 2 735 548 A1 | 12/1996 |
| JP | A-02-008533 | 1/1990 |
| JP | A-04-266651 | 9/1992 |
| JP | A-09-250622 | 9/1997 |
| JP | A-H10-047453 | 2/1998 |
| JP | A-H10-169715 | 6/1998 |
| JP | A-2001-82577 | 3/2001 |
| JP | A-2001-116111 | 4/2001 |
| JP | A-2006-009817 | 1/2006 |
| JP | A-2006-029553 | 2/2006 |
| JP | A-2007-113661 | 5/2007 |
| JP | A-2007-155132 | 6/2007 |
| JP | A-2008-208855 | 9/2008 |
| JP | A-2009-168226 | 7/2009 |
| JP | A-2010-038312 | 2/2010 |
| JP | A-2011-047442 | 3/2011 |
| WO | WO 2010079273 A1 * | 7/2010 |
| WO | WO 2010/146280 A1 | 12/2010 |

OTHER PUBLICATIONS

Nov. 4, 2013 Supplementary European Search Report issued in European Patent Application No. 12746548.2.
May 15, 2012 International Search Report issued in International Patent Application No. PCT/JP2012/053154 (with translation).
May 15, 2012 International Search Report issued in International Patent Application No. PCT/JP2012/052786 (with translation).
Dec. 10, 2012 Office Action issued in U.S. Appl. No. 13/367,641.
Mar. 26, 2013 Office Action issued in U.S. Appl. No. 13/368,923.
May 17, 2013 Office Action issued in U.S. Appl. No. 13/367,641.
Jul. 15, 2013 Office Action issued in U.S. Appl. No. 13/368,923.
Sep. 30, 2013 Notice of Allowance issued in U.S. Appl. No. 13/368,923.
Oct. 9, 2013 Office Action issued in U.S. Appl. No. 13/367,641.
U.S. Appl. No. 13/368,923, filed Feb. 8, 2012.
U.S. Appl. No. 13/367,641, filed Feb. 7, 2012.
Jan. 17, 2014 Notice of Allowance issued in U.S. Appl. No. 13/368,923.
Apr. 8, 2014 Office Action issued in U.S. Appl. No. 13/367,641.
Feb. 7, 2014 Supplementary European Search Report issued in European Patent Application No. 12746587.0.
May 14, 2014 Office Action issued in U.S. Appl. No. 13/368,923.
May 15, 2014 Extended European Search Report issued in European Patent Application No. 14165257.8.

* cited by examiner

DAMPER APPARATUS

INCORPORATION BY REFERENCE

The disclosure of Japanese Patent Application No. 2011-070505 filed on Mar. 28, 2011 including the specification, drawings and abstract is incorporated herein by reference in its entirety.

BACKGROUND OF THE INVENTION

The present invention relates to a damper apparatus that includes an input element to which power is transferred from a motor, a first intermediate element to which power is transferred from the input element via a first elastic body, a second intermediate element to which power is transferred from the first intermediate element via a second elastic body, and an output element to which power is transferred from the second intermediate element via a third elastic body.

DESCRIPTION OF THE RELATED ART

As a fluid power transmission apparatus mounted in a vehicle, there has been known a torque converter equipped with a clutch mechanism for mechanically linking a front cover and a turbine to each other, and a damper apparatus made up of a first damper mechanism and a second damper mechanism that operates in series to the first damper mechanism (refer to, for example, Japanese Patent Application Publication No. 2007-113661 (JP 2007-113661 A). The first damper mechanism that constitutes the damper apparatus of the aforementioned torque converter includes a plurality of first coil springs, a pair of retaining plates (input-side members) to which torque is transferred from the clutch mechanism and which contact one of mutually adjacent first coil springs, a first center plate (intermediate member) that contacts the other one of mutually adjacent first coil springs, and a second center plate that is relatively rotatably disposed radially inward of the first center plate and that is between and in contact with mutually adjacent first coil springs. Besides, the second damper mechanism includes a plurality of second coil springs that are disposed radially outward of the first damper mechanism (the first coil springs) and that each contact the first center plate and a driven plate. Due to this construction, in this torque converter, when the clutch mechanism is engaged, torque from the front cover is transferred to the turbine, that is, to a transmission apparatus, via a path made up of the pair of retaining plates, one of the first coil springs, the second center plate, the other one of the first coil springs, the first center plate, the second coil springs on the radially outer side, and the driven plate.

CITATIONS OF THE RELATED ART

Summary of the Invention

In the foregoing conventional damper apparatus, the plurality of first coil springs on the radially inner side are caused to operate in series, and the second coil springs on the radially outer side are caused to operate in series to the plurality of first coil springs on the radially inner side, so as to increase the torsion angle of the damper apparatus. However, in the above-described conventional damper apparatus, there is a limit to the increasing of the torsion angle of the first coil springs on the radially inner side, so that there occurs a limit to the lengthening of the stroke of the damper apparatus, that is, the lowering of the stiffness thereof. Besides, in the above-described conventional damper apparatus, since the second center plate as an intermediate element is disposed between the first coil springs adjacent to each other, the first center plate and the second center plate that are intermediate elements sometimes resonate. If the resonance of the first and second center plates occurs when the rotation speed of a piston of the clutch mechanism (engine rotation speed) is relatively low and the vibration level of the whole damper apparatus is relatively high, there is a possibility that the resonance will further heighten vibration level of the whole damper apparatus and therefore relatively large vibration will be transferred to a downstream side of the damper apparatus. However, JP 2007-113661 A does not consider the resonance of the first and second center plates at all.

The present invention reduces, in a damper apparatus that includes a plurality of intermediate elements, the influence of the resonance of the plurality of intermediate elements while attaining lower stiffness of the apparatus.

The damper apparatus according to the present invention adopts the following in order to achieve the above.

A damper apparatus according to an aspect of the present invention includes: an input element to which power is transferred from a motor; a first elastic body to which power is transferred from the input element; a first intermediate element to which power is transferred from the first elastic body; a second elastic body to which power is transferred from the first intermediate element; a second intermediate element to which power is transferred from the second elastic body; a third elastic body to which power is transferred from the second intermediate element; and an output element to which power is transferred from the third elastic body, wherein the first and second elastic bodies are disposed radially outward of the third elastic body, and are disposed adjacent to each other on a single circumference; and the first intermediate element has an annular outer peripheral portion that surrounds the first and second elastic bodies, and a pair of contact portions that are formed on peripheral edge portions on two sides of the outer peripheral portion so as to protrude from the peripheral edge portions toward an inner periphery side and so as to face each other, and that are between and in contact with first elastic body and the second elastic body.

Due to the above-described structure, the torsion angle of the first and second elastic bodies can be made larger, so that the damper apparatus can be made less stiff (to have longer stroke), in comparison with the case where the first and second elastic bodies are disposed in series at the inner periphery side in the apparatus. Besides, the first intermediate element of the damper apparatus has an annular outer peripheral portion that surrounds the first and second elastic bodies, and a pair of contact portions that are formed on peripheral edge portions on respective sides of the outer peripheral portion so as to protrude from the peripheral edge portions radially inward and so as to face each other, and that are between and in contact with the first elastic body and the second elastic body. If the first intermediate element is structured as described above, the first intermediate element is further reduced in weight. Due to this, the inertia of the first intermediate portion and, therefore, the inertia of the first and second intermediate elements occurring when they resonate as substantially one integral body are lessened to heighten the resonance frequency of the first and second intermediate element. Then, the resonance of the first intermediate element and the second intermediate element can be caused to occur when the rotation speed of the input element is relatively high, that is, when the rotation speed of the motor is relatively high and the torque from the motor (excitation force) is relatively low.

Furthermore, in this damper apparatus, since the first intermediate element moves in the contracting direction of the first elastic body when the first elastic body and the second elastic body contract, the amount of movement of the first intermediate element relative to the first elastic body and the second elastic body (relative amount of movement) can be decreased. Due to this, the first and second elastic bodies and the first intermediate element are restrained from being in sliding contact, so that the influence of the hystereses of the first and second elastic bodies, that is, the friction forces that act on the first and second elastic bodies at the time of decrease in load, on the vibration damping effects achieved by the first and second elastic bodies can be even further lowered. As a result, in this damper apparatus, it becomes possible to reduce the influence of the resonance of a plurality of intermediate elements while attaining lower stiffness of the apparatus.

Besides, the first intermediate element may be rotatably supported by the second intermediate element, and may have a plurality of supported portions that are formed on a peripheral edge portion of the outer peripheral portion with an interval left between the supported portions in a circumferential direction so as to protrude from the peripheral edge portion radially inward and that each slidingly contact the second intermediate element. Due to this, by making the interval between mutually adjacent ones of the supported portions of the first intermediate element as large as possible so as to further reduce the weight of the first intermediate element, so that the inertia of the first intermediate element and, therefore, the inertia of the first and second intermediate elements occurring when they resonate as substantially one integral body can be even further lessened. It also becomes possible to adjust the inertia of the first intermediate element and, therefore, the inertia of the first and second intermediate elements occurring when they resonate as substantially one integral body, by adjusting the dimension of the supported portions of the first intermediate element.

Furthermore, the second intermediate element may have a plurality of support portions that are formed with an interval left between the support portions in a circumferential direction so as to protrude radially outward, and that each slidably contact the first intermediate element. Due to this, by making the interval between mutually adjacent ones of the support portions of the second intermediate element as large as possible so as to further reduce the weight of the second intermediate element, so that the inertia of the second intermediate element and, therefore, the inertia of the first and second intermediate elements occurring when they resonate as substantially one integral body can be even further lessened. It also becomes possible to adjust the inertia of the second intermediate element and, therefore, the inertia of the first and second intermediate elements occurring when they resonate as substantially one integral body, by adjusting the dimension of the support portions of the second intermediate element.

Besides, the input element may have a contact portion that contacts one end of the first elastic body, and the contact portion of the first intermediate element may contact the other end of the first elastic body, and also may contact one end of the second elastic body that is adjacent to the first elastic body, and the second intermediate element may have a contact portion that contacts the other end of the second elastic body, and a contact portion that contacts one end of the third elastic body, and the output element may have a contact portion that contacts the other end of the third elastic body. The second intermediate element may be constructed as a single member having the plurality of support portions, a contact portion that contacts the second elastic body, and a contact portion that contacts the third elastic body. Due to this, the second intermediate element can be even further reduced in weight, so that the inertia of the second intermediate element can be even further lessened.

Furthermore, the first and second elastic bodies may be coil springs. Due to this, the sliding contact between the first and second elastic bodies and a different member can be restrained, so that the influence of the hystereses of the first and second elastic bodies on the vibration damping effects achieved by the elastic bodies can be further lowered, in comparison with the case where a long elastic body is disposed at the outer periphery side in the apparatus.

Besides, the third elastic body may be an arc spring. Thus, by adopting an arc spring as the third elastic body on the radially inner side, it is possible to even further lower the stiffness (lengthen the stroke) of the damper apparatus. By disposing the third elastic body that is an arc spring radially inward of the first and second elastic bodies, it is possible to lessen the centrifugal force that acts on the third elastic body and thus lessen the hysteresis of the third elastic body and therefore maintain good vibration damping characteristic of the third elastic body.

Furthermore, stiffness of the first elastic body may be higher than the stiffness of the second elastic body. Due to this, it becomes easier to substantially integrate the first intermediate element and the second intermediate element, and the further heightening of the stiffness of the first elastic body heightens the resonance frequency of the first and second intermediate elements, so that the resonance of the first intermediate element and the second intermediate element can be caused to occur when the rotation speed of the input element is relatively high, that is, when the rotation speed of the motor is relatively high and the torque from the motor (excitation force) is relatively low. As a result, the heightening of the vibration level of the whole damper apparatus (output element) due to the resonance of the first intermediate element and the second intermediate element can be suppressed, and therefore transfer of relatively large vibration to a downstream side of the damper apparatus can be restrained. Therefore, in this damper apparatus, it becomes possible to appropriately reduce the influence of the resonance of a plurality of intermediate elements.

Besides, the stiffness of the third elastic body may be lower than the stiffness of the second elastic body. Due to this, it is possible to improve the vibration damping characteristic of the whole damper apparatus by making the third elastic body less stiff while lowering the resonance frequency of the whole damper apparatus and heightening the resonance frequency of the first intermediate element and the second intermediate element by heightening the stiffness of the first elastic body.

Furthermore, the stiffness of the third elastic body may be lower than the stiffness of the first elastic body, and higher than or equal to the stiffness of the second elastic body. Due to this, the resonance frequency of the first intermediate element and the second intermediate element can be further heightened, and the resonance frequency of the whole damper apparatus can be further lowered.

The input element may be connected, via a lockup clutch, to an input member that is linked to the motor, and the output element may be linked to an input shaft of a transmission apparatus. That is, if the foregoing damper apparatus is used, it becomes possible to execute the lockup by the lockup clutch, that is, the linkage of the input member and the input shaft of the transmission apparatus, while appropriately restraining the transfer of vibration from the input member to the input shaft of the transmission apparatus when the rotation speed of the motor is very low.

DETAILED DESCRIPTION OF THE EMBODIMENTS

Next, embodiments of the present invention will be described.

Figure 1:
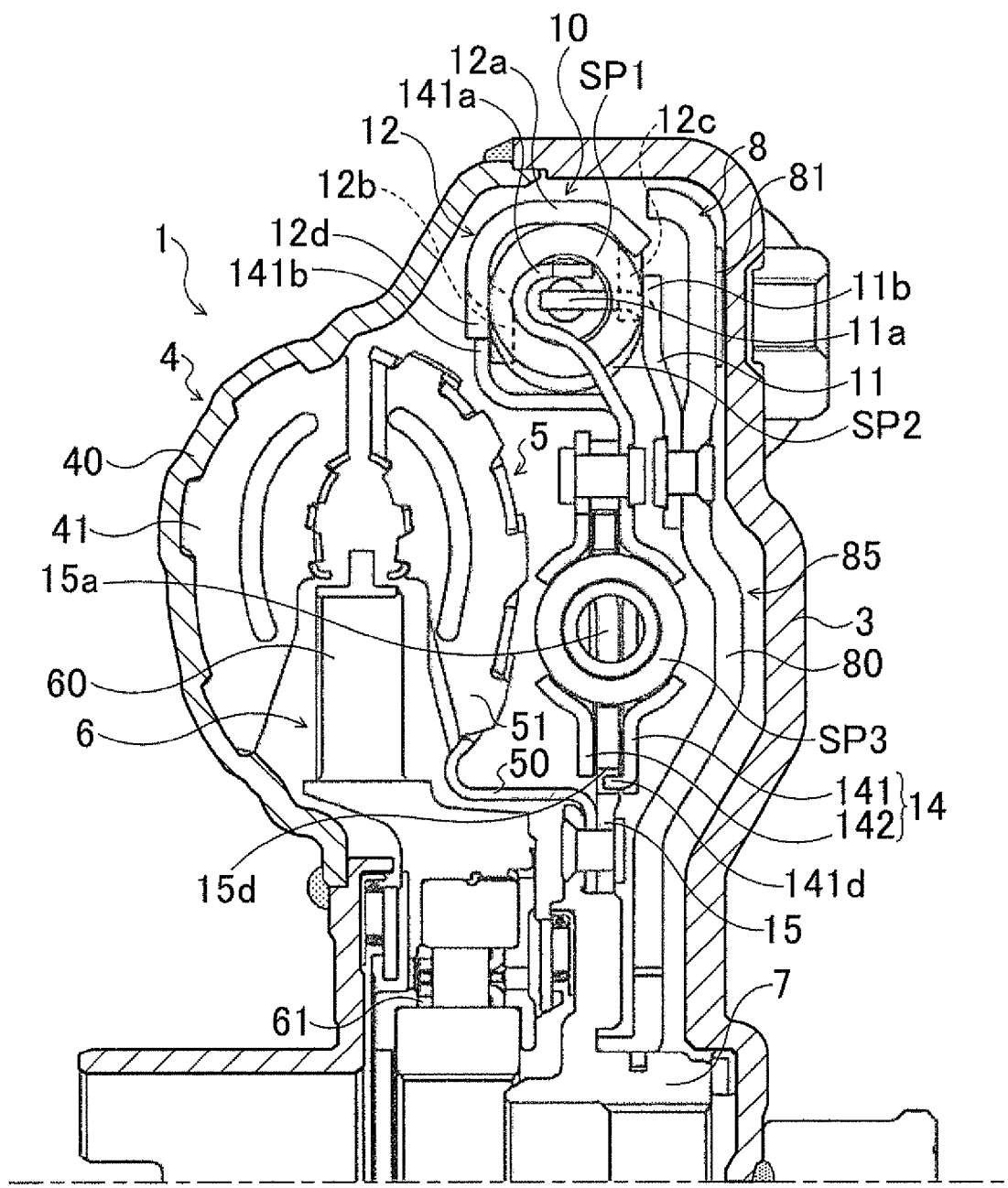
FIG. 1 is a partial cross-sectional view that shows a fluid power transmission apparatus 1 that includes a damper apparatus 10 according to an embodiment of the present invention.

FIG. 1 is a construction diagram showing a fluid power transmission apparatus 1 equipped with a damper apparatus 10 according to an embodiment of the present invention. The fluid power transmission apparatus 1 shown in the drawing is a torque converter mounted as a starting device in a vehicle equipped with an engine (internal combustion engine) as a motor, and includes: a front cover (input member) 3 linked to a crankshaft of the engine (not shown); a pump impeller (input-side fluid power transmission element) 4 fixed to the front cover 3; a turbine runner (output-side fluid power transmission element) 5 that is rotatable coaxially with the pump impeller 4; a stator 6 that adjusts the flow of hydraulic oil (hydraulic fluid) from the turbine runner 5 to the pump impeller 4; a damper hub (output member) 7 fixed to an input shaft of a transmission apparatus (not shown) that is an automatic transmission (AT) or a continuously variable transmission (CVT); a lockup clutch mechanism 8 of a single-plate friction type that has a lockup piston 80; and the damper apparatus 10 connected to the damper hub 7 and also connected to the lockup piston 80.

The pump impeller 4 has a pump shell 40 that is closely fixed to the front cover 3, and a plurality of pump blades 4 disposed on an inside surface of the pump shell 40. The turbine runner 5 has a turbine shell 50, and a plurality of turbine blades 51 disposed on an inside surface of the turbine shell 50. The turbine shell 50 is fitted to the damper hub 7, and is also fixed to the damper hub 7 via a rivet. The stator 6 has a plurality of stator blades 60. The rotation direction of the stator 6 is set to only one direction by a one-way clutch 61. The pump impeller 4 and the turbine runner 5 face each other, and the pump impeller 4, the turbine runner 5 and the stator 6 form a torus (annular flow path) through which the hydraulic oil is circulated.

Figure 2:
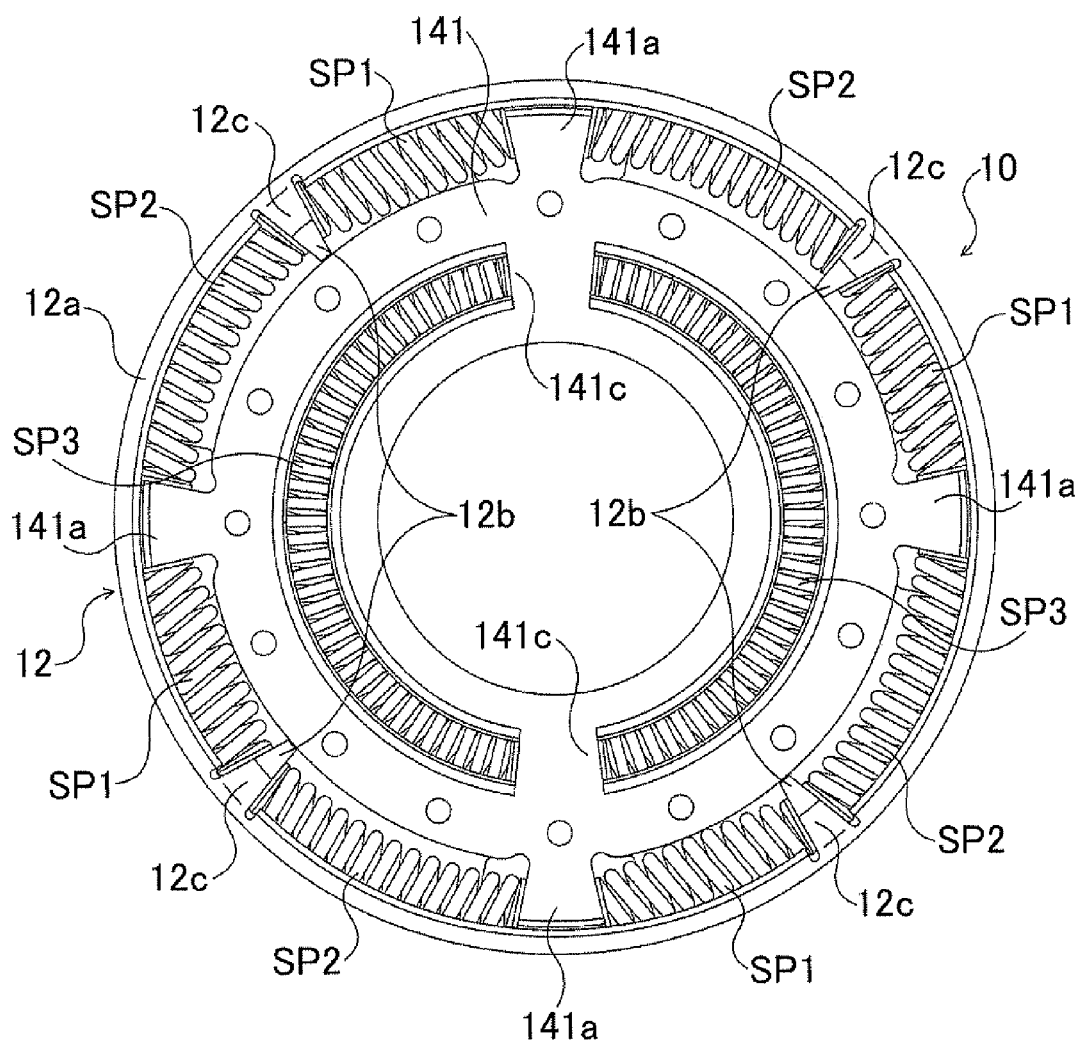
FIG. 2 is construction diagram showing the damper apparatus 10.

The damper apparatus 10, as shown in FIG. 1 and FIG. 2, includes: a drive member 11 as an input element; a first intermediate member (first intermediate element) 12 that engages with the drive member 11 via a plurality of first springs (first elastic bodies) SP1; a second intermediate member (second intermediate element) 14 that engages with the first intermediate member 12 via a plurality of second springs (second elastic bodies) SP2; and an driven member (output element) 15 that engages with the second intermediate member 14 via a plurality of third springs (third elastic bodies) SP3. In the embodiment, the first and second springs SP1 and SP2 are coil springs made of a metal material which are wound in a spiral form so as to have an axis that extends straight under no-load conditions, and the third springs SP3 are arc springs made of a metal material which are wound so as to have an axis that extends in the shape of an arc under no-load conditions.

The drive member 11 has a plurality of spring contact portions 11a each of which contacts one end of a corresponding one of the first springs SP1, and a plurality of spring support portions 11b. Then, the drive member 11 is fixed to the lockup piston 80 of the lockup clutch mechanism 8 via a rivet, and is disposed in an outer periphery-side region in a housing interior defined by the front cover 3 and the pump shell 40 of the pump impeller 4. The first intermediate member 12 is constructed as an annular member capable of supporting, together with the plurality of spring support portions 11b of the drive member 11, the first and second springs SP1 and SP2 on the same circumference such that the first and second springs SP1 and SP2 are adjacent to each other (alternate with each other) and are slidable. In the embodiment, the first intermediate member 12 is rotatably supported about an axis of the fluid power transmission apparatus 1 by the second intermediate member 14, and is disposed in the outer periphery-side region in the housing interior.

Figure 3:
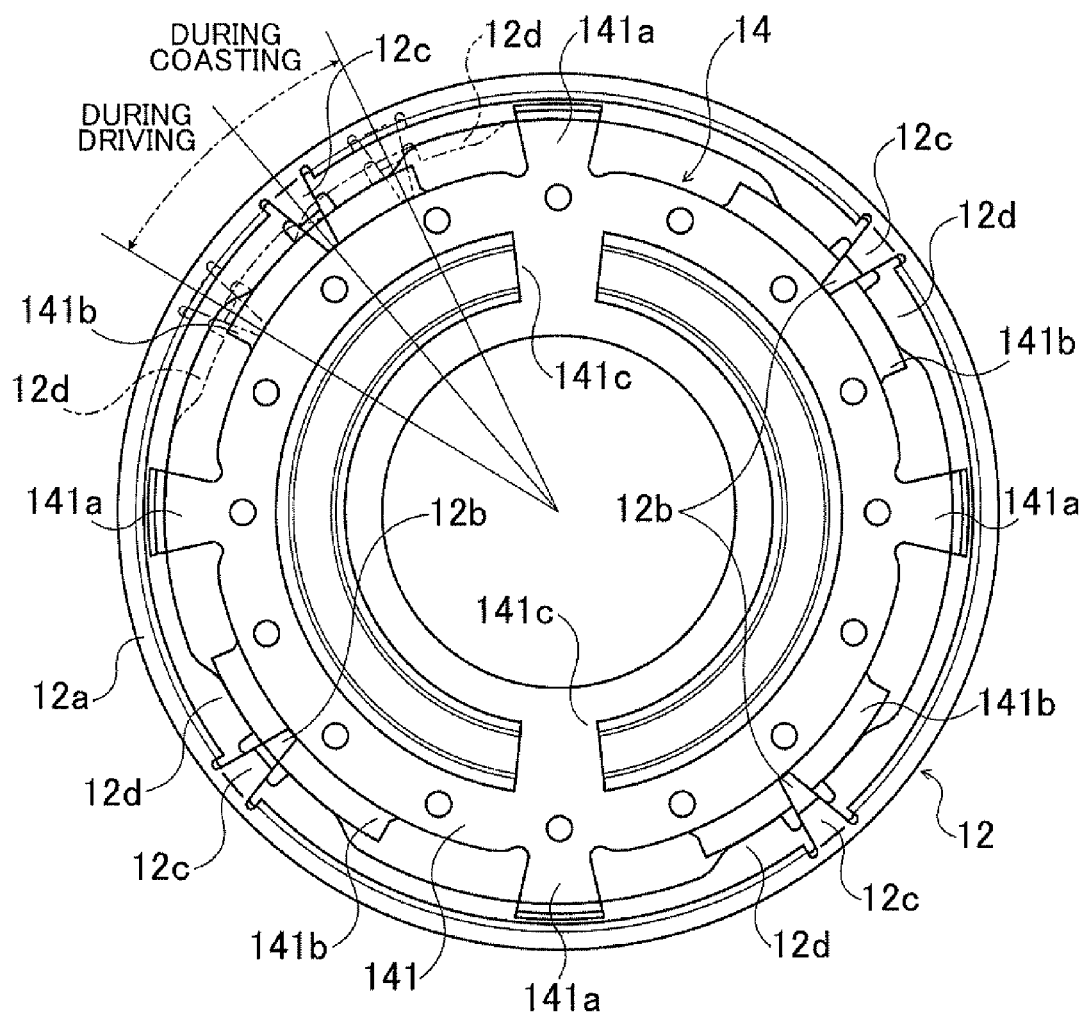
FIG. 3 is a construction diagram showing a first intermediate member 12 and a second intermediate member 14 of the damper apparatus 10.

As shown in FIGS. 1 to 3, the first intermediate member 12 has an annular outer peripheral portion 12a that surrounds the first springs SP1 and the second springs SP2, and pairs of spring contact portions 12b and 12c formed on peripheral edge portions on respective sides of the outer peripheral portion 12a (the left and right sides thereof in FIG. 1) so as to protrude radially inward (toward the radially inner side) and so as to face each other. A plurality of the spring contact portions 12b and a plurality of the spring contact portions 12c (four for each type in the embodiment) are equidistantly formed in the first intermediate member 12. As can be seen from FIG. 2, each pair of spring contact portions 12b and 12c is disposed between the other end of a corresponding one of the first springs SP1 and one end of a second spring SP2 adjacent to the corresponding one of the first springs SP1, and contact both the other end of the first spring SP1 and the one end of the second spring SP2. Furthermore, the first intermediate members 12, as shown in FIGS. 1 and 3, has a plurality of supported portions 12d that are formed on one of the peripheral edge portions (in FIG. 1, a left-side, that is, a transmission apparatus-side) of the outer peripheral portion 12a with intervals left therebetween in the circumferential direction so as to protrude from the peripheral edge portion radially inward (toward the radially inner side) and that each slidingly contact the second intermediate member 14.

The second intermediate member 14 is constructed of an annular first plate 141 and an annular second plate 142 fixed to the first plate 141 via a rivet. In this embodiment, the second intermediate member 14 is supported by the driven member 15 so as to be rotatable about an axis of the fluid power transmission apparatus 1. The first plate 141 of the second intermediate member 14 has, at an outer periphery side thereof, a plurality of spring contact portions 141a that each contacts the other end of a corresponding one of the second springs SP2, and a plurality of support portions 141b for rotatably supporting the first intermediate members 12, and has, at an inner periphery side, a plurality of spring support portions for slidably supporting the third springs SP3. As shown in FIG. 1 and FIG. 3, the plurality of support portions 141b of the second intermediate member 14 (the first plate 141) are formed with intervals left therebetween in the circumferential direction so that each support portion 141b protrudes radially outward (toward the radially outer side) and slidingly contacts a corresponding one of the supported portions 12d of the first intermediate member 12.

In the embodiment, the dimensions (circumferential lengths) of each of the supported portions 12d of the first intermediate member 12 and each of the support portions 141b of the second intermediate member, as exemplified in FIG. 3, are set as small (short) as possible within such a range that sufficient contact between mutually corresponding ones of the supported portions 12d and the support portions 141b is secured during the operation of the damper apparatus 10, taking into account the rotation angle (torsion angle) of the first intermediate member 12 relative to the second intermediate member 14 during driving of the vehicle, and the rotation angle of the first intermediate member 12 relative to the second intermediate member 14 during coasting of the vehicle. That is, the intervals between mutually adjacent ones of the supported portions 12d of the first intermediate member 12 and the intervals between mutually adjacent ones of the support portions 141b of the second intermediate member 14 are set as large as possible within such a range that the smooth operation of the damper apparatus 10 can be secured. Besides, the second plate 142 of the second intermediate member 14 has spring support portions that face the respective spring support portions of the first plate 141 and that slidably support the third springs SP3. Then, on the first and second plates 141 and 142, there are formed a plurality of spring contact portions 141c (see FIG. 2 and FIG. 3) that each contact one end of a corresponding one of the third springs SP3.

Due to this, if each first spring SP1 is disposed between a spring contact portion 11a of the drive member 11 and a pair of spring contact portions 12b and 12c of the first intermediate member 12 and each second spring SP2 is disposed between a pair of spring contact portions 12b and 12c of the first intermediate member 12 and a second intermediate member 14, more specifically, a spring contact portion 141a of the first plate 141, the plurality of first springs SP1 and the plurality of second springs SP2 are disposed concentrically at the outer peripheral portion of the damper apparatus 10. Besides, the plurality of third springs SP3 are each disposed apart in radial directions of the fluid power transmission apparatus 1 from the first and second springs SP1 and SP2, and are positioned radially inward of the first and second springs SP1 and SP2.

The driven member 15 is disposed between the first plate 141 and the second plate 142 of the second intermediate member 14, and is fixed to the damper hub 7. Besides, the driven member 15 has a plurality of spring contact portions 15a that each contact the other end of a corresponding one of the third springs SP3. Furthermore, the driven member 15 has a plurality of arc-shaped slits 15d that engage with protrusions 141d that are formed so as to extend in the axis direction of the fluid power transmission apparatus 1 from an inner peripheral portion of the first plate 141 of the second intermediate member 14. When each protrusion 141d of the first plate 141 is engaged with (loosely fitted to) a corresponding one of the slits 15d of the driven member 15, the second intermediate member 14 is supported by the driven member 15 and is disposed around the axis of the fluid power transmission apparatus 1, and is rotatable relative to the driven member 15 in a range commensurate with the circumferential length of the slits 15d.

The lockup clutch mechanism 8 is able to execute a lockup for linking the front cover 3 and the damper hub 7 to each other via the damper apparatus 10 and also to cancel the lockup. In this embodiment, the lockup piston 80 of the lockup clutch mechanism 8, as shown in FIG. 1, is disposed on the inner side of the front cover 3 and in the vicinity of an inner wall surface on an engine-side (right-side in the drawing) internal surfacewa of the front cover 3, and is fitted to the damper hub 7 so as to be slidable in the axis direction and rotatable. Besides, a friction material 81 is stuck to a front cover 3-side surface of an outer periphery-side portion of the lockup piston 80. Then, between the back surface of the lockup piston 80 (the right-side surface in the drawing) and the front cover 3, there is defined a lockup chamber 85 connected to a hydraulic control unit, not shown in the drawings, via a hydraulic oil supply hole, not shown, and an oil passage formed in the input shaft.

When power is transferred between the pump impeller 4 and the turbine runner 5 without executing the lockup by the lockup clutch mechanism 8, the hydraulic oil supplied into the pump impeller 4 and the turbine runner 5 flows into the lockup chamber 85, so that the inside of the lockup chamber 85 is filled with the hydraulic oil. Therefore, at this time, the lockup piston 80 does not move toward the front cover 3, and the lockup piston 80 is not in friction engagement with the front cover 3. Then, at the time of cancellation of the lockup when the lockup by the lockup clutch mechanism 8 is not executed in this manner, the power from the engine as a motor is transferred, as can be seen FIG. 4, to the input shaft of the transmission apparatus via a path made up of the front cover 3, the pump impeller 4, the turbine runner 5 and the damper hub 7.

Besides, if the pressure in the lockup chamber 85 is reduced by a hydraulic pressure control unit that is not shown in the drawings, the lockup piston 80, due to the pressure difference, moves toward the front cover 3 and is brought into friction engagement with the front cover 3. Due to this, the front cover 3 is linked to the damper hub 7 via the damper apparatus 10. During the time of lockup when the front cover 3 and the damper hub 7 are linked to each other by the lockup clutch mechanism 8 in this manner, the power from the engine as a motor is transferred, as can be seen FIG. 4, to the input shaft of the transmission apparatus via a path made up of the front cover 3, the lockup clutch mechanism 8, the drive member 11, the first springs SP1, the first intermediate members 12, the second springs SP2, the second intermediate member 14, the third springs SP3, the driven member 15 and the damper hub 7. At this time, the fluctuation (vibration) of the torque input into the front cover 3 is absorbed by the first and second springs SP1 and SP2 and the third springs SP3 of the damper apparatus 10.

Then, in the fluid power transmission apparatus 1 according to the embodiment, at a stage when the rotation speed of the engine linked to the front cover 3 reaches a very low lockup rotation speed Nlup of, for example, about 1000 rpm, the lockup clutch mechanism 8 executes the lockup. This will improve the efficiency of power transfer between the engine and the transmission apparatus, which will further improve the fuel economy of the engine. Note that, if the pressure reduction in the lockup chamber 85 is stopped, the lockup piston 80 moves away from the front cover 3 due to decrease in the pressure difference that is caused by inflow of hydraulic oil into the lockup chamber 85, so that the lockup is cancelled.

In order to execute the lockup at the stage when the rotation speed of the engine reaches the very low lockup rotation speed Nlup of, for example, about 1000 rpm, it is necessary to appropriately damp the vibration between the engine and the transmission apparatus by using the damper apparatus 10 when the rotation speed of the engine falls within a low rotation speed range in the vicinity of the aforementioned lockup rotation speed Nlup. Therefore, in the damper apparatus 10 according to the embodiment, in order to improve the vibration damping characteristic, lower stiffness (longer stroke) of the damper apparatus 10 is attained by disposing the first and second springs SP1 and SP2 radially outward of the third springs SP3 and disposing the first and second springs SP1 and SP2 adjacent to each other substantially on the same circumference, in comparison with the case where first and second springs are disposed in series at an inner periphery side in the apparatus. Furthermore, in the damper apparatus 10 according to the embodiment, among the first to third springs SP1 to SP3 that are arranged in series, the third springs SP3 disposed at the inner periphery side in the apparatus are designed as being are springs so as to attain further lower stiffness, and also the centrifugal force that acts on the third springs SP3 is lessened to lessen the hysteresis of the third springs SP3, that is, the friction force that acts on the third springs SP3 at the time of decrease in load, whereby appropriate vibration damping characteristic of the third springs SP3 is secured.

Besides, in the damper apparatus 10 according to the embodiment, the first and second springs SP1 and SP2 are disposed in series at an outer periphery side in the apparatus, the first intermediate member 12 is disposed so as to cover the first and second springs SP1 and SP2, so that the hysteresis of each of the first and second springs SP1 and SP2, that is, the friction force that acts on each of the first and second springs SP1 and SP2 at the time of decrease in load, lessens. Therefore, the hysteresis of both (total) of the first and second springs SP1 and SP2 occurring when they operate in series can be lessened in comparison with, for example, the case where long springs having a circumferential length comparable to the total circumferential length of the first and second springs SP1 and SP2 (the sum of the circumferential lengths of the two types of springs) are disposed at an outer periphery side in the apparatus. Furthermore, in the damper apparatus 10 according to the embodiment, the first intermediate member 12 is constructed so as to surround the first and second springs SP1 and SP2, and has pairs of spring contact portions 12b and 12c, each pair being disposed between and in contact with a first spring SP1 and a second spring SP2. Due to this, since the first intermediate member 12 moves in the contracting direction of the first springs SP1 and the second springs SP2 when the first springs SP1 and the second springs SP2 contract in association with the operation of the damper apparatus 10 and the like, the amount of movement of the first intermediate member 12 relative to the first springs SP1 and the second springs SP2 (relative movement amount) can be decreased.

Figure 4:
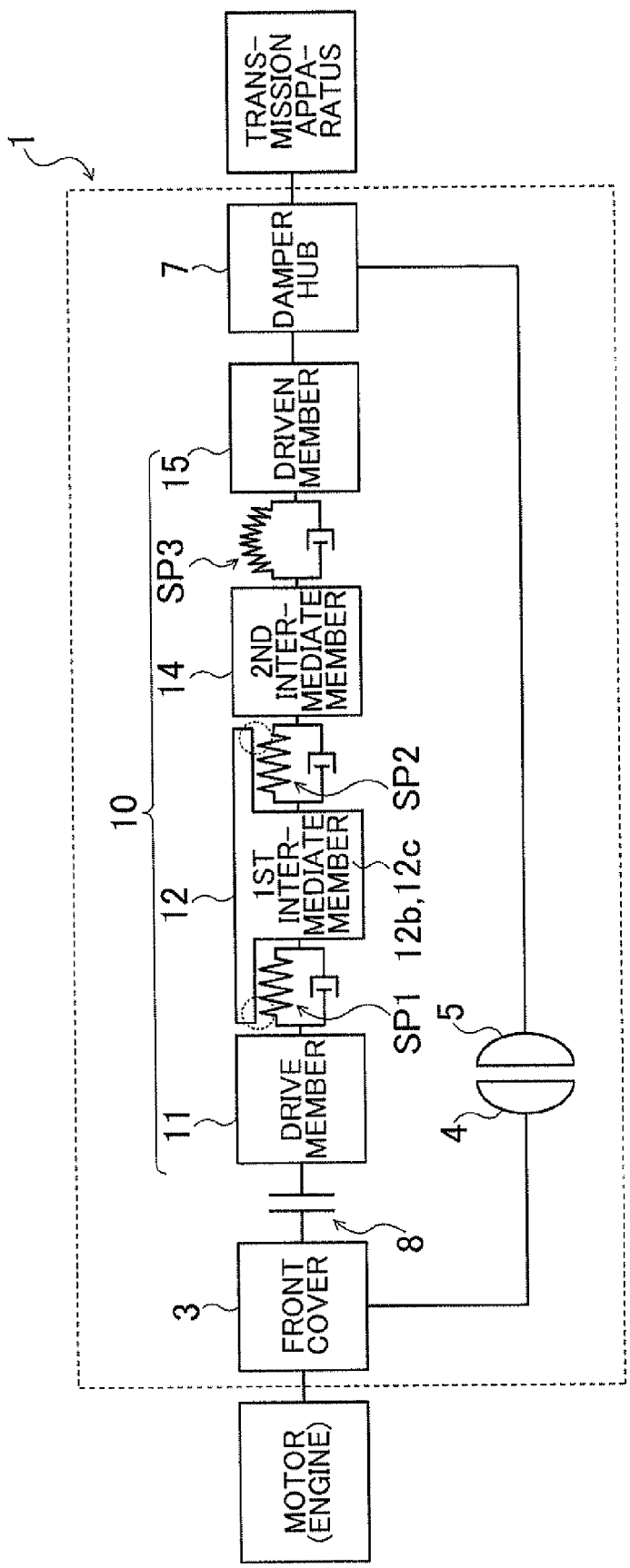
FIG. 4 is a general construction diagram of the fluid power transmission apparatus 1.

That is, as can be seen from FIG. 4, when the first springs SP1 and the second springs SP2 contract, the first intermediate member 12 moves in the contracting direction of the first springs SP1 and the second springs SP2, so that in the vicinity of a pair of spring contact portions 12b and 12c, the first and second springs SP1 and SP2 and the first intermediate member 12 are in substantially (almost) no sliding contact, and the sliding contact between the first and second springs SP1 and SP2 and the first intermediate member 12 mainly occurs at the opposite end portions of the first and second springs SP1 and SP2 (see circle markings in FIG. 4) from the spring contact portion 12b and 12c-side end portions of the first and second springs SP1 and SP2. As a result, the first and second springs SP1 and SP2 and the first intermediate member 12 can be restrained from being in sliding contact, and the influence of the hystereses of the first and second springs SP1 and SP2 on their respective vibration damping effects can be even further lowered. Besides, in the damper apparatus 10 according to the embodiment, since coil springs are adopted as the first and second springs SP1 and SP2, outer peripheral portions of the first and second springs SP1 and SP2 and a different member (the first intermediate member 12 in the foregoing embodiment) are restrained from being in sliding contact, and the influence of the hystereses of the first and second springs SP1 and SP2 on their vibration damping effects can be further lowered, in comparison with the case where long coil springs or arc springs are disposed at an outer periphery side in the apparatus.

On the other hand, in the fluid power transmission apparatus 1 according to the embodiment, since the first and second intermediate members 12 and 14 as intermediate elements are disposed between the first springs SP1 and the third springs SP3 of the damper apparatus 10, the first intermediate member 12 and the second intermediate member 14 sometimes resonate. If the resonance of the first intermediate member 12 and the second intermediate member 14 occurs when the rotation speed of the engine falls within a low rotation speed range in the vicinity of the aforementioned lockup rotation speed Nlup and the vibration level of the whole damper apparatus 10 (the driven member 15 as an output element) is relatively high, there is a possibility that the resonance of the first intermediate member 12 and the second intermediate member 14 will result in a further heightened vibration level of the whole damper apparatus 10 and relatively large vibration will be transferred to a downstream side of the damper apparatus 10, that is, the input shaft of the transmission apparatus. Therefore, in order to smoothly execute the lockup by the lockup clutch mechanism 8 at a stage when the rotation speed of the engine reaches a very low lockup rotation speed Nlup, it is appropriate to cause the resonance of the first intermediate member 12 and the second intermediate member 14 to occur when the rotation speed of the engine after completion of the lockup is relatively high and the torque from the engine, that is, the excitation force, is relatively low. To this end, it is appropriate to further heighten a resonance frequency fi of the first and second intermediate members 12 and 14.

Besides, in order to execute the lockup at the stage when the a very low lockup rotation speed Nlup of, for example, about 1000 rpm, is reached as described above, it is necessary to prevent occurrence of the resonance of the whole damper apparatus 10 when the lockup is executed and the rotation speed of the engine falls within a low rotation speed range in the vicinity of the lockup rotation speed Nlup mentioned above, or when, after that, the rotation speed of the engine further heightens. Due to this, it is appropriate to further lower the resonance frequency ft of the whole damper apparatus 10 so that the resonance of the whole damper apparatus 10 occurs during a stage in which the rotation speed of the engine is as low as possible when it is assumed that the lockup is executed from a stage when the rotation speed of the engine is further lower than the lockup rotation speed Nlup, that is, in a rotation speed range where the lockup is actually not executed.

Herein, the state in which the first and second intermediate members 12 and 14 resonate as substantially one integral body corresponds to a state in which the first springs SP1 and the third springs SP3 are connected in parallel to the first and second intermediate members 12 and 14 and the second springs SP2, as a single mass. In this case, if the spring constant of the first springs SP1 is "k1" and the spring constant of the third springs SP3 is "k3", the resultant spring constant k13 of the system is "k1+k3", and the resonance frequency (eigenfrequency) fi of the first and second intermediate members 12 and 14 and the second springs SP2 which resonate as substantially one integral body can be expressed as $fi = 1/2\pi \cdot \sqrt{\{(k1+k3)/I\}}$. In the expression, "I" is the inertia of the first intermediate member 12, the second intermediate member 14 and the second springs SP2 as a single mass, and the unit of the inertia I is "kg·m2". That is, the inertia I of the first and second intermediate members 12 and 14 when they resonate as substantially one integral body can be obtained by distributing halves of the inertia of the second springs SP2 to the first intermediate member 12 and to the second intermediate member 14, and may be used as the sum of the inertia of the first intermediate member 12, the inertia of the second intermediate member 14 and the inertia of the second springs SP2 disposed between the two members. Besides, when the whole of the damper apparatus 10 integrally resonates, the resultant spring constant k123 of the system is expressed as $1/k123 = 1/k1 + 1/k2 + 1/k3$, and the resonance frequency ft of the whole damper apparatus 10 is expressed as $ft = 1/2\pi \cdot \sqrt{(k123)/It}$ (where "It" is the inertia of the entire damper) wherein "k2" is the spring constant of the second springs SP2 since the drive member 11, the first springs SP1, the first intermediate member 12, the second springs SP2, the second intermediate member 14, the third springs SP3 and the driven member 15 are arranged in series.

Hence, in order to cause the resonance of the first intermediate member 12 and the second intermediate member 14 to occur when the rotation speed of the engine after completion of the lockup is relatively high, the sum of the spring constant k1 of the first springs SP1 and the spring constant k3 of the third springs SP3 is made as large as possible or the inertia I of the first and second intermediate members 12 and 14 is made as small as possible so as to further heighten the resonance frequency fi of the first and second intermediate members 12 and 14. Besides, in order to further lower the resonance frequency ft of the whole damper apparatus 10, the resultant spring constant k123 of the system is made as small as possible. Note that, in this specification, "stiffness" and "spring constant" both represent "force (torque)/torsional angle (the unit is "Nm/rad" or "Nm/deg")", and are synonymous. Besides, the stiffness of a spring (spring constant) becomes lower (smaller) if the wire diameter of the spring is lessened or if the number of turns thereof per unit length is decreased, and the stiffness thereof becomes higher (larger) if the wire diameter of the spring is enlarged or if the number of turns thereof per unit length is increased.

On the grounds of these, in the damper apparatus 10 according to the embodiment, the stiffness of the first springs SP1 is set higher than the stiffness of the second and third springs SP2 and SP3. That is, in the embodiment, the spring constant k1 of the first springs SP1 is set considerably larger (e.g., about several times) than the spring constants k2 and k3 of the second and third springs SP2 and SP3. If the stiffness of the first springs SP1 is set higher than the stiffness of the second springs SP2 in this manner, it becomes easier to substantially integrate the first intermediate member 12 and the second intermediate member 14, and the further heightening of the stiffness of the first springs SP1 heightens the resonance frequency fi of the first and second intermediate members 12 and 14, so that the resonance of the first intermediate member 12 and the second intermediate member 14 can be caused to occur when the rotation speed of the engine is relatively high and the torque from the engine (excitation force) is relatively low.

Besides, the first intermediate member 12 of the damper apparatus 10 according to the embodiment has the annular outer peripheral portion 12a that surrounds the first and second springs SP1 and SP2, and pairs of spring contact portions 12b and 12c that are formed on peripheral edge portions on respective sides of the outer peripheral portion 12a so as to protrude radially inward (toward the radially inner side) and face each other, each pair being between and in contact with a first spring SP1 and a second spring SP2. If the first intermediate member 12 is constructed in this manner, the first intermediate member 12 can be further reduced in weight. Due to this, the inertia of the first intermediate member 12 and therefore the inertia I of the first and second intermediate members 12 and 14 occurring when they resonate as substantially one integral body can be lessened, and the resonance frequency fi of the first and second intermediate members 12 and 14 can be further heightened.

Furthermore, the first intermediate member 12 has a plurality of supported portions 12d that are formed with intervals left therebetween in the circumferential direction so as to protrude from a peripheral edge portion of the outer peripheral portion 12a radially inward (toward the radially inner side) and that slidingly contact the second intermediate member 14. The second intermediate member 14 that rotatably supports the first intermediate member 12 has a plurality of support portions 141b that are formed with intervals left therebetween in the circumferential direction so as to protrude radially outward (toward the radially outer side) and that slidingly contact the supported portions 12d of the first intermediate member 12. Due to this, as shown in FIG. 3, by making the intervals between mutually adjacent ones of the supported portions 12d of the first intermediate member 12 as large as possible and making the intervals between mutually adjacent ones of the support portions 141b of the second intermediate member 12 as large as possible so as to even further reduce the weights of the first and second intermediate members 12 and 14, the inertia I of the first and second intermediate members 12 and 14 occurring when they resonate as substantially one integral body can be even further lessened.

Besides, in the damper apparatus 10 according to the embodiment, since the stiffness of the first springs SP1 is set higher than the stiffness of the third springs SP3, it becomes possible to improve the vibration damping characteristic of the damper apparatus 10 while attaining lower stiffness (longer stroke) of the damper apparatus 10 by making use of the characteristic of the arc springs that are the third springs SP3 and also to appropriately damp the resonance of the first intermediate member 12 and the second intermediate member 14 by the third springs SP3. Further, in the damper apparatus 10 according to the embodiment, in order to make use of the characteristic of are springs that they are more easily reduced in stiffness than coil springs and to more appropriately maintain vibration damping characteristic of the third springs SP3 that are arc springs disposed radially inward of the first and second springs SP1 and SP2 to reduce hysteresis, the spring constant k3 of the third springs SP3 is set smaller than the spring constant k2 of the second springs SP2. That is, by setting of the spring constants of the first to third springs SP1 to SP3 as k1>k2>k3 (k1>>k2>k3), it is possible to improve the vibration damping characteristic of the whole damper apparatus 10 by making the third springs SP3 less stiff while heightening the resonance frequency fi of the first and second intermediate members 12 and 14 and lowering the resonance frequency ft of the whole damper apparatus 10.

Figure 5:
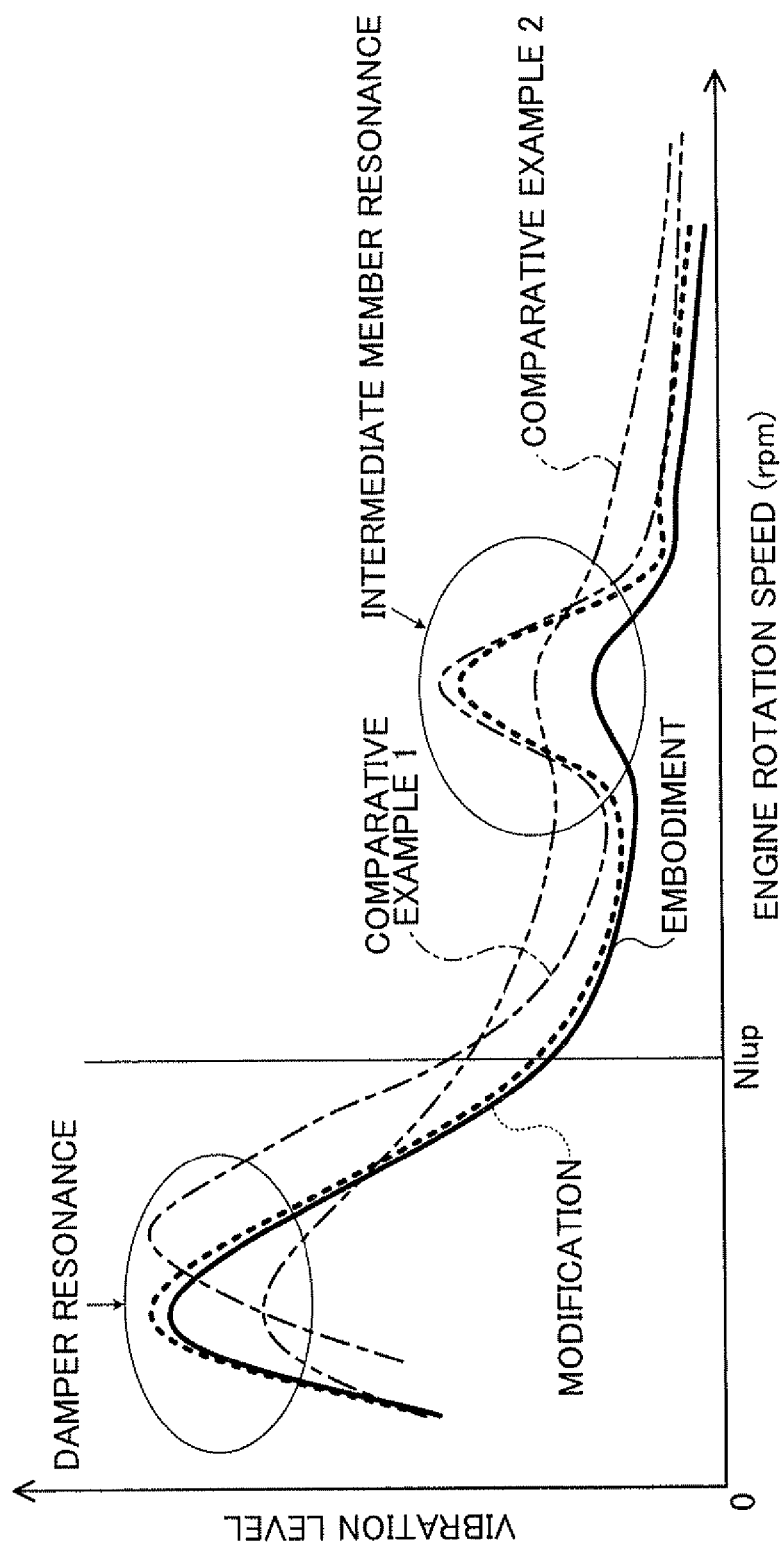
FIG. 5 is an illustrative diagram exemplifying a relation between the rotation speed of an engine as a motor and the vibration level of the damper apparatus 10.

FIG. 5 is an illustrative diagram exemplifying a relation between the vibration level of the damper apparatus 10 described above and the rotation speed of the engine in the state where the lockup is being executed. The drawing shows results of simulations with torsional vibration systems, which were performed so as to confirm the usefulness of disposing the first and second springs SP1 and SP2 radially outward of the third springs SP3 and disposing the first and second springs SP1 and SP2 adjacent to each other substantially on the same circumference, and the drawing exemplifies relations between the rotation speed of the engine (front cover 3) and the vibration level at the driven member 15 (damper hub 7) that is an output element of a damper apparatus, which were obtained through the simulations regarding a plurality of damper apparatuses that include the damper apparatus 10 according to the embodiment. In the simulations, the specifications of the engine as a motor, the specifications of the pump impeller 4, the turbine runner 5 and the lockup clutch mechanism 8, etc. were basically the same, and the structures of the damper apparatus and the kinds and the magnitudes of stiffness of the first to third springs SP1 to SP3 are varied among the plurality of damper apparatuses.

A solid line in FIG. 5 shows vibration levels of the damper apparatus 10 according to the embodiment. Besides, an interrupted line in FIG. 5 shows the vibration level of a damper apparatus according to a modification in which coil springs were adopted as the third springs SP3 instead of arc springs in the damper apparatus 10 according to the embodiment (the spring constants of the first to third springs SP1 to SP3 are k1>k2>k3 (k1>>k2>3) as in the embodiment). Furthermore, a one-dot chain line in FIG. 5 shows the vibration levels of a model of a damper apparatus that has substantially the same structure as that described in Japanese Patent Application Publication No. 2007-113661 (JP 2007-113661 A) (hereinafter, referred to as "comparative example 1"), and a two-dot chain line in FIG. 5 shows the vibration levels of a model of the damper apparatus having a structure in which two kinds of springs are disposed in series at an outer periphery side in the apparatus by applying the structure described in Japanese Patent Application Publication No. 2007-113661 (JP 2007-113661 A) (hereinafter, referred to as "comparative example 2").

The damper apparatus according to comparative example 1 includes: first springs on the radially inner side to which power is transferred from an input member; a first intermediate member to which power is transferred from the first springs; second springs which are disposed adjacent to the first springs substantially on the same circumference and to which power is transferred from the first intermediate member; a second intermediate member to which power is transferred from the second springs; third springs which are disposed radially outward of the first and second springs and to which power is transferred from the second intermediate member; and an output member to which power is transferred from the third springs. In the damper apparatus according to comparative example 1, the first to third springs were all coil springs, and the spring constants of the first to third springs were set as k1>k2>k3, as in the embodiment, within a structurally allowable range so as to heighten the resonance frequency of the first and second intermediate members and lower the resonance frequency of the whole damper apparatus.

Besides, the damper apparatus according to comparative example 2 includes: first springs on the radially inner side to which power is transferred from an input member; a first intermediate member to which power is transferred from the first springs; second springs which are disposed radially outward of the first springs and to which power is transferred from the first intermediate member; a second intermediate member to which power is transferred from the second springs; third springs which are disposed adjacent to the second springs substantially on the same circumference and to which power is transferred from the second intermediate member; and an output member to which power is transferred from the third springs. In the damper apparatus according to comparative example 2 as well, the first to third springs were all coil springs, and the spring constants of the first to third springs were set as k1>k2>k3, as in the embodiment, within a structurally allowable range so as to heighten the resonance frequency of the first and second intermediate members and lower the resonance frequency of the whole damper apparatus. Besides, in the damper apparatus according to comparative example 2, the second intermediate element has contact portions that are between and in contact with the second springs and the third springs, and the output member has portions that are constructed so as to surround the second and third springs ("retainer portions 78c" in Japanese Patent Application Publication No. 2007-113661 (JP 2007-113661 A)).

As shown in FIG. 5, in the damper apparatus according to comparative example 1, despite adjustment of the spring constants of the first to third springs, since the torsion angle of the first and second springs at the inner peripheral side in the apparatus cannot be made large, the resonance frequency of the whole damper apparatus cannot be sufficiently lowered, so that the vibration level in the vicinity of the lockup rotation speed Nlup becomes relatively high. Besides, in the damper apparatus according to comparative example 1, since the torsion angle of the first and second springs cannot be made large and the sufficient lowering of the stiffness of the damper apparatus cannot be attained, a high resonance level of the first intermediate member and the second intermediate member results. On the other hand, in the damper apparatus according to comparative example 2, the torsion angle of the second and third springs provided at the outer peripheral side in the apparatus can be enlarged so as to attain low stiffness. Therefore, the vibration level can be lowered as a whole. However, in the damper apparatus according to comparative example 2, since the second and third springs contract within retainer portions of the output member, at least both end portions of each second spring and inner peripheral surfaces of the retainer portions are in sliding contact and both end portions of each third spring and inner peripheral surfaces of the retainer portions are in sliding contact, so that the hystereses of the second springs and the third springs become large. As a result, the vibration level in the vicinity of the lockup rotation speed Nlup becomes relatively high.

In contrast, in the damper apparatus 10 according to the embodiment and the damper apparatus according to the modification, the resonance frequency ft of the whole damper apparatus 10 can be made lower, and the influence of the hystereses of the first and second springs SP1 and SP2 on the vibration damping effects achieved by the springs can be further lowered. Therefore, as shown in FIG. 5, the vibration level in the vicinity of the lockup rotation speed Nlup can be appropriately lowered. Therefore, in the damper apparatus 10 according to the embodiment and the damper apparatus according to the modification, it becomes possible to very smoothly execute the lockup by the lockup clutch mechanism 8 at the stage when the rotation speed of the engine reaches a very low lockup rotation speed Nlup. Besides, as can be seen from comparison between the embodiment and the modification, as in the damper apparatus 10 according to the embodiment, since arc springs for use as the third springs SP3 are used in order to attain lower stiffness (longer stroke) and the third springs SP3 are disposed radially inward of the first and second springs SP1 and SP2 so as to reduce the hystereses, the resonance of the first intermediate member 12 and the second intermediate member 14 that occurs at the stage when the rotation speed of the engine is further heightened can be appropriately damped.

Figure 6:
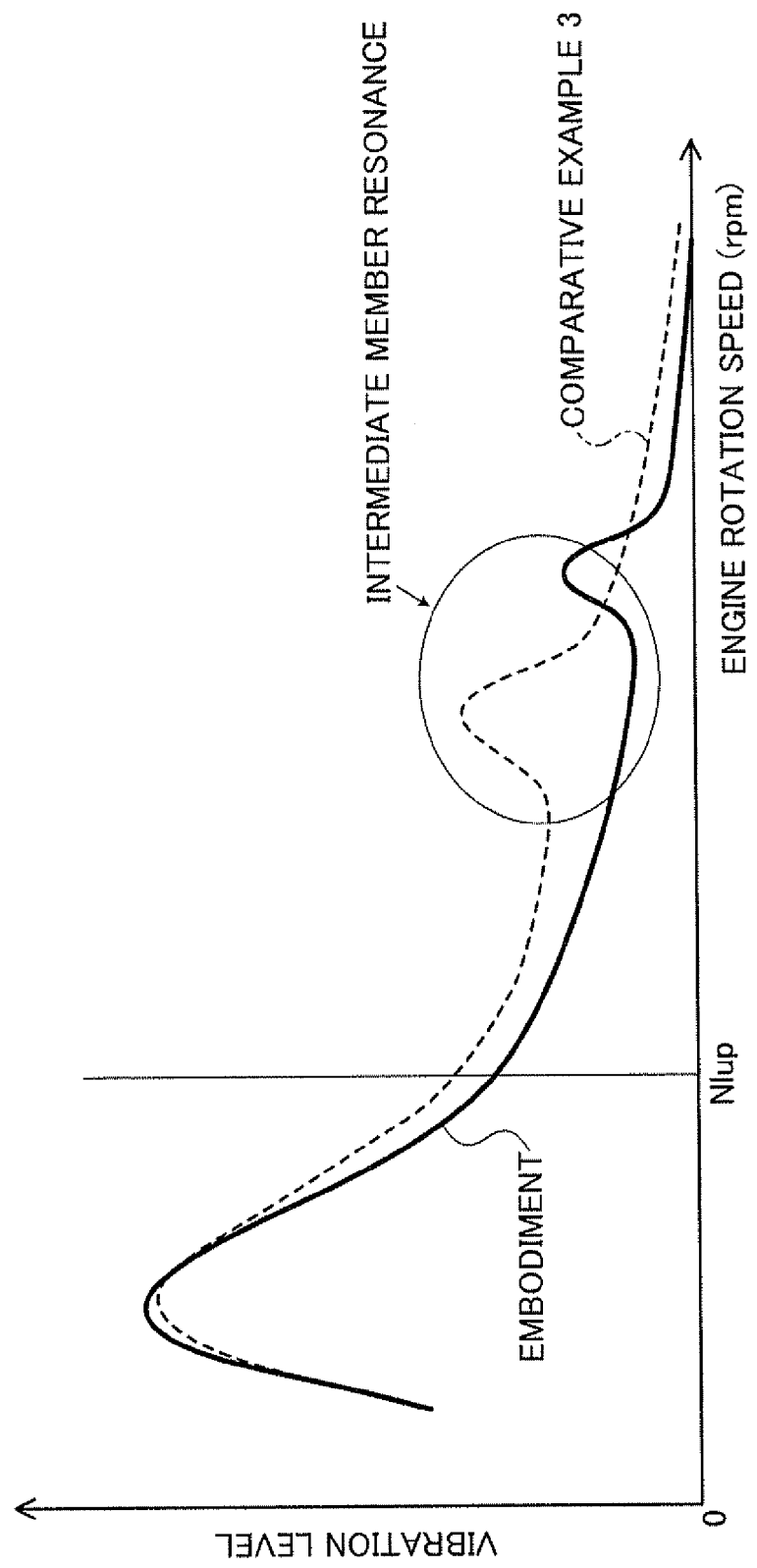
FIG. 6 is an illustrative diagram exemplifying a relation between the rotation speed of the engine as the motor and the vibration level of the damper apparatus 10.

Furthermore, FIG. 6 shows results of simulations with torsional vibration systems which were performed to confirm the usefulness of the weight reduction of the first intermediate member 12 and the second intermediate member 14 as described above. In FIG. 6, a solid line shows the vibration levels of the damper apparatus 10 according to the embodiment. Besides, an interrupted line in FIG. 6 shows the vibration levels of a damper apparatus according to comparative example 3 that corresponds to a construction obtained by partially changing the construction of the first intermediate member 12 and the second intermediate member 14 of the above-described damper apparatus 10. The first intermediate member of the damper apparatus according to comparative example 3 has spring contact portions that are formed by further inwardly bending extended-out portions that extend radially inward (toward the radially inner side) from one of two peripheral edge portions of the outer peripheral portion 12a described above. Besides, in the damper apparatus according to comparative example 3, the supported portions of the first intermediate member are formed substantially all along the peripheral edge portions of the outer peripheral portion, and the intervals between a plurality of support portions of the second intermediate member are set as small as possible. As shown in FIG. 6, in the damper apparatus 10 according to the embodiment in which weight reductions of the first intermediate member 12 and the second intermediate member 14 are attained as described above, the resonance of the first intermediate member 12 and the second intermediate member 14 occurs at the stage when the rotation speed of the engine is further heightened, and the vibration level of the resonance is lowered, in comparison with the damper apparatus according to comparative example 3. Therefore, the weight reduction of the first intermediate member 12 and the second intermediate member 14 as described above is very effective to cause the resonance of the first intermediate member 12 and the second intermediate member 14 to occur at the stage when the rotation speed of the engine is further heightened and to lower the vibration level of the resonance.

As described above, the damper apparatus 10 included in the fluid power transmission apparatus 1 according to the embodiment includes: the drive member 11 to which power is transferred from the engine as a motor; the first intermediate member 12 to which power is transferred from the drive member 11 via the first springs SP1; the second intermediate member 14 to which power is transferred from the first intermediate member 12 via the second springs SP2; and the driven member 15 to which power is transferred from the second intermediate member 14 via the third springs SP3. Further, in the damper apparatus 10, the first and second springs SP1 and SP2 are disposed radially outward of the third springs SP3, and are disposed adjacent to each other substantially on the same circumference. Due to this, the damper apparatus 10 can be made less stiff (longer stroke) in comparison with the case where the first and second springs SP1 and SP2 are disposed in series at an inner periphery side in the apparatus.

Besides, the first intermediate member 12 of the damper apparatus according to the embodiment has: the annular outer peripheral portion 12a that surrounds the first and second springs SP1 and SP2; a pair of spring contact portions 12b and 12c that are formed on the peripheral edge portions on the two sides of the outer peripheral portion 12a so as to protrude radially inward and face each other and that are between and in contact with the first springs SP1 and the second springs SP2. If the first intermediate member 12 is constructed in this manner, the first intermediate member 12 can be further reduced in weight. Due to this, the inertia of the first intermediate member 12 and therefore the inertia I of the first and second intermediate members 12 and 14 occurring when they resonate as substantially one integral body are lessened so as to heighten the resonance frequency fi of the first and second intermediate members 12 and 14. Then, the resonance of the first intermediate member 12 and the second intermediate member 14 can be caused to occur when the rotation speed of the drive member 11 is relatively high, that is, the rotation speed of the engine is relatively high, and the torque from the engine (excitation force) is relatively low. Furthermore, in the damper apparatus 10 according to the embodiment, since the first intermediate member 12 moves in the contracting direction of the first springs SP1 and the like when the first springs SP1 and the second springs SP2 contract, the amount of movement of the first intermediate member 12 relative to the first springs SP1 or the second springs SP2 (relative amount of movement) can be decreased. Due to this, the first and second springs SP1 and SP2 and the first intermediate member 12 are restrained from being in sliding contact, so that the hystereses of the first and second springs SP1 and SP2, that is, the friction forces that act on the first and second springs SP1 and SP2 at the time of decrease in load, on their respective vibration damping effects can be further lowered. As a result, in the damper apparatus 10 according to the embodiment, it becomes possible to reduce the influence of the resonance of the first intermediate member 12 and the second intermediate member 14 while attaining lower stiffness of the apparatus.

Furthermore, the first intermediate member 12 of the damper apparatus 10 has a plurality of supported portions 12d that are rotatably supported by the second intermediate member 14 and that are formed on a peripheral edge portion of the outer peripheral portion 12a with intervals left therebetween in the circumferential direction so as to protrude from the peripheral edge portion radially inward and that each slidably contact the second intermediate member 14. Besides, the second intermediate member 14 has a plurality of support portions 141b that are formed with intervals left therebetween in the circumferential direction so as to protrude radially outward (toward the radially outer side) and that each slidably contact a corresponding one of the supported portions 12d of the first intermediate member 12. Due to this, if the intervals between mutually adjacent ones of the supported portions 12d of the first intermediate member 12 and the intervals between mutually adjacent ones of the support portions 141b of the second intermediate member 14 are set as large as possible within such a range that the smooth operation of the damper apparatus 10 can be secured as described above, the first intermediate member 12 and the second intermediate member 14 can be further reduced in weight, so that the inertias of the first intermediate member 12 and the second intermediate member 14 and, therefore, the inertia I of the first and second intermediate members 12 and 14 occurring when they resonate as substantially one integral body can be even further lessened.

Figure 7:
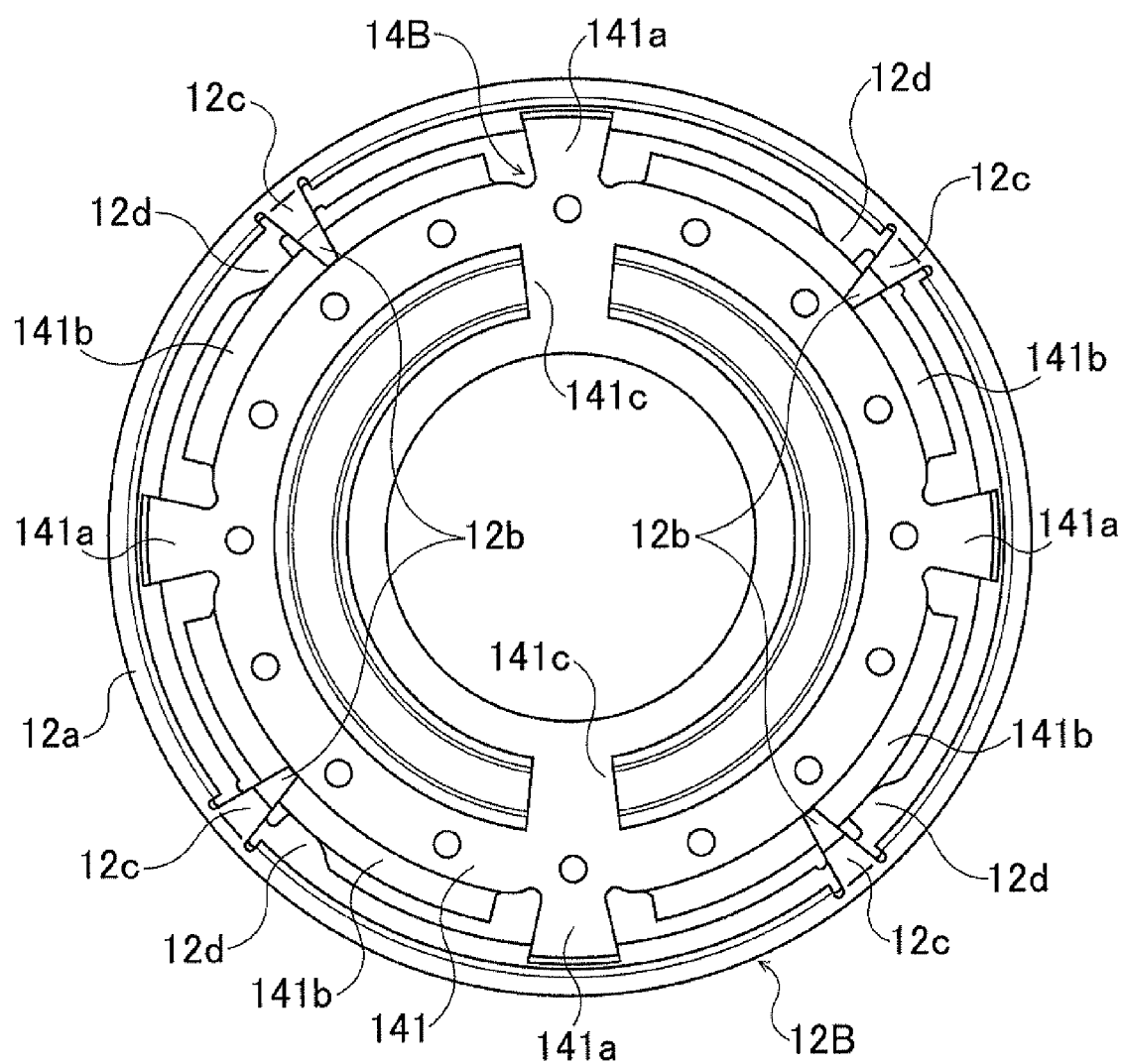
FIG. 7 is a construction diagram showing a first intermediate member 12B and a second intermediate member 14B according to a modification.
Figure 8:
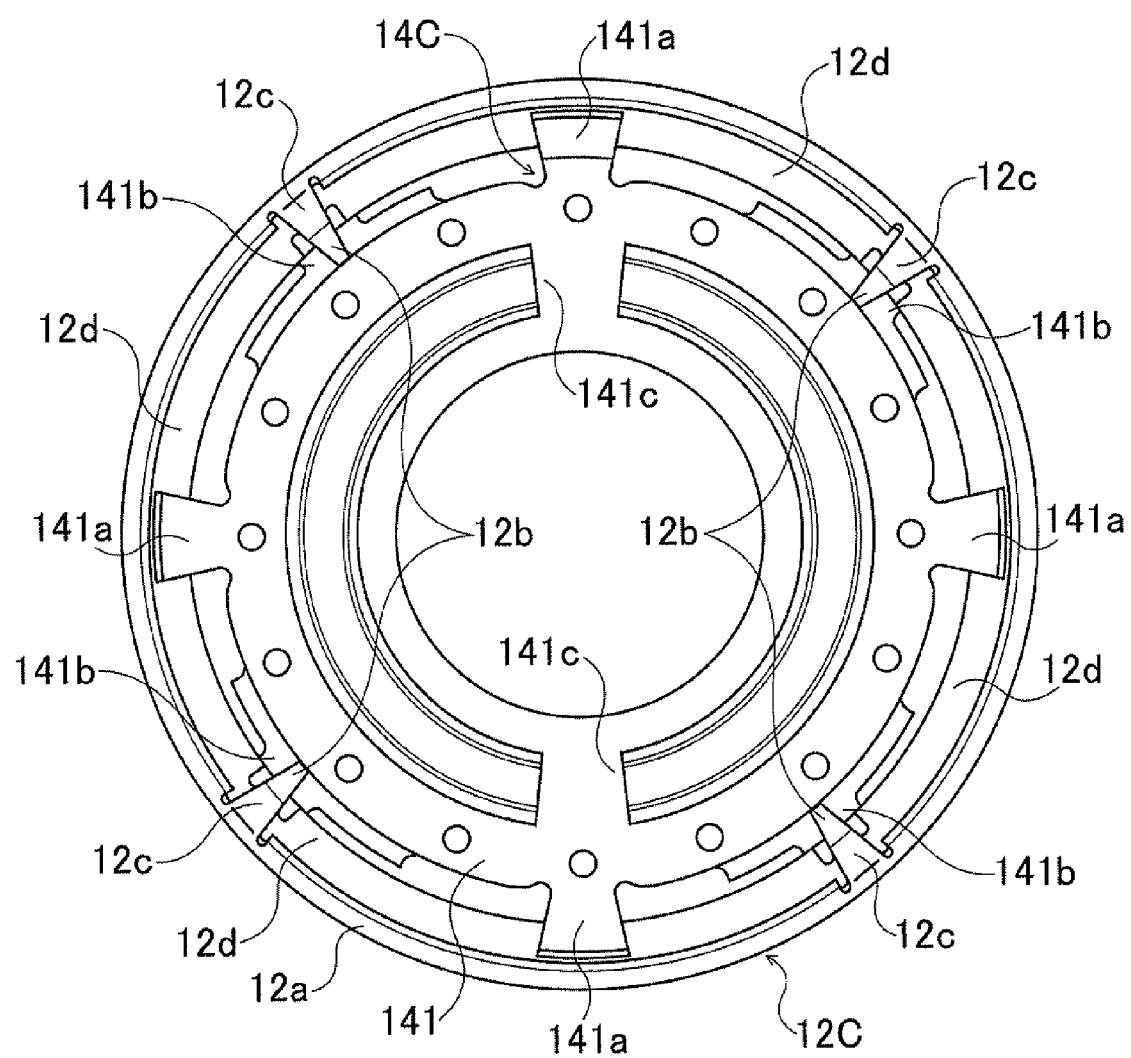
FIG. 8 is a construction diagram showing a first intermediate member 12C and a second intermediate member 14C according to another modification.

Further, it becomes possible to adjust the inertias of the first intermediate member 12 and the second intermediate member 14 and, therefore, the inertia I of the first and second intermediate members 12 and 14 occurring when they resonate as substantially one integral body, according to the characteristic of the vehicle in which the damper apparatus 10 is mounted, the characteristic of the linked engine, etc., by adjusting the dimension of the supported portions 12d of the first intermediate member 12 (the intervals between the supported portions 12s) and the dimension of the support portions 141b of the second intermediate member 14 (the intervals between the support portions 141b). Therefore, depending on the vehicle in which the damper apparatus 10 is mounted or the linked engine, a first intermediate member 12B having supported portions 12d of which the dimension (circumferential length) is made as small as possible and a second intermediate member 14B having support portions 141b of which the dimension (circumferential length) is made as large as possible may be combined as shown in FIG. 7, or a first intermediate member 12C having supporter portions 12d of which the dimension (circumferential length) is made as large as possible and a second intermediate, member 14C having support portions 141b of which the dimension (circumferential direction) is made as small as possible may be combined as shown in FIG. 8.

Besides, if coil springs are adopted as the first and second springs SP1 and SP2 as in the foregoing embodiment, the sliding contact between the first and second springs SP1 and SP2 and a different member (first intermediate member 12) can be restrained, so that the influence of the hystereses of the first and second springs SP1 and SP2 on the vibration damping effects achieved by the springs can be further lowered, in comparison with the case where long coil springs or arc springs are disposed at the outer periphery side in the apparatus. Furthermore, by adopting arc springs as the third springs SP3 on the radially inner side, it is possible to even further lower the stiffness (lengthen the stroke) of the damper apparatus 10. Further, by disposing the third springs SP3 that are arc springs radially inward of the first and second springs SP1 and SP2, it is possible to lessen the centrifugal force that acts on the third springs SP3 and thus lessen the hysteresis of the third springs SP3 and therefore maintain good vibration damping characteristic of the third springs SP3.

Furthermore, as in the foregoing embodiment, if the stiffness of the first springs SP1 is made higher than the stiffness of the second springs SP2, the resonance frequency fi of the first and second intermediate members 12 and 14 can be heightened, so that the resonance of the first intermediate member 12 and the second intermediate member 14 can be caused to occur when the rotation speed of the engine (front cover 3) is relatively high and the torque from the engine (excitation force) is relatively low. As a result, the heightening of the vibration level of the whole damper apparatus 10 (the driven member 15 as an output element) due to the resonance of the first intermediate member 12 and the second intermediate member 14 can be suppressed, and therefore the transfer of relatively large vibration to the downstream side of the damper apparatus 10 can be restrained. Therefore, in the damper apparatus 10 according to the embodiment, it becomes possible to appropriately reduce the influence of the resonance of the first intermediate member 12 and the second intermediate member 14.

Besides, if the stiffness of the third springs SP3 is made lower than the stiffness of the second springs SP2 as in the foregoing embodiment, it is possible to improve the vibration damping characteristic of the whole damper apparatus 10 by making the third springs SP3 less stiff while heightening the resonance frequency fi of the first intermediate member 12 and the second intermediate member 14 and lowering the resonance frequency ft of the whole damper apparatus 10 by making the stiffness of the first springs SP1 even higher. However, it is also permissible that the stiffness of the third springs SP3 is lower than the stiffness of the first springs SP1, and is higher than or equal to the stiffness of the second springs SP2. That is, if the spring constant k3 of the third springs SP3 is made greater than or equal to the spring constant k2 of the second springs SP2, the sum of the spring constant k1 of the first springs SP1 and the spring constant k3 of the third springs SP3 can be made larger to make the resonance frequency fi of the first and second intermediate members 12 and 14 higher and make the resonance frequency ft of the whole damper apparatus 10 lower. Note that, depending on the characteristic of the engine or the like that is an object to be connected to the damper apparatus, good results for practical use can be obtained by using coil springs for all the first to third springs SP1 to SP3 and setting the spring constants of the first to third springs SP1 to SP3 as being k1>k2>k3 (k1>>k2>k3) or k1>k3≥k2 (k1>>k3≥k2).

Further, the drive member 11 that constitutes the damper apparatus 10 according to the embodiment is connected, via the lockup clutch mechanism 8, to the front cover 3 as an input member connected to the engine, and the driven member 15 is linked to the input shaft of the transmission apparatus. That is, if the damper apparatus 10 is used, it becomes possible to execute the lockup by the lockup clutch mechanism 8, that is, the linkage between the input shaft of the transmission apparatus and the front cover 3, while appropriately restraining the transfer of vibration from the front cover 3 to the input shaft of the transmission apparatus when the rotation speed of the engine is very low.

Figure 9:
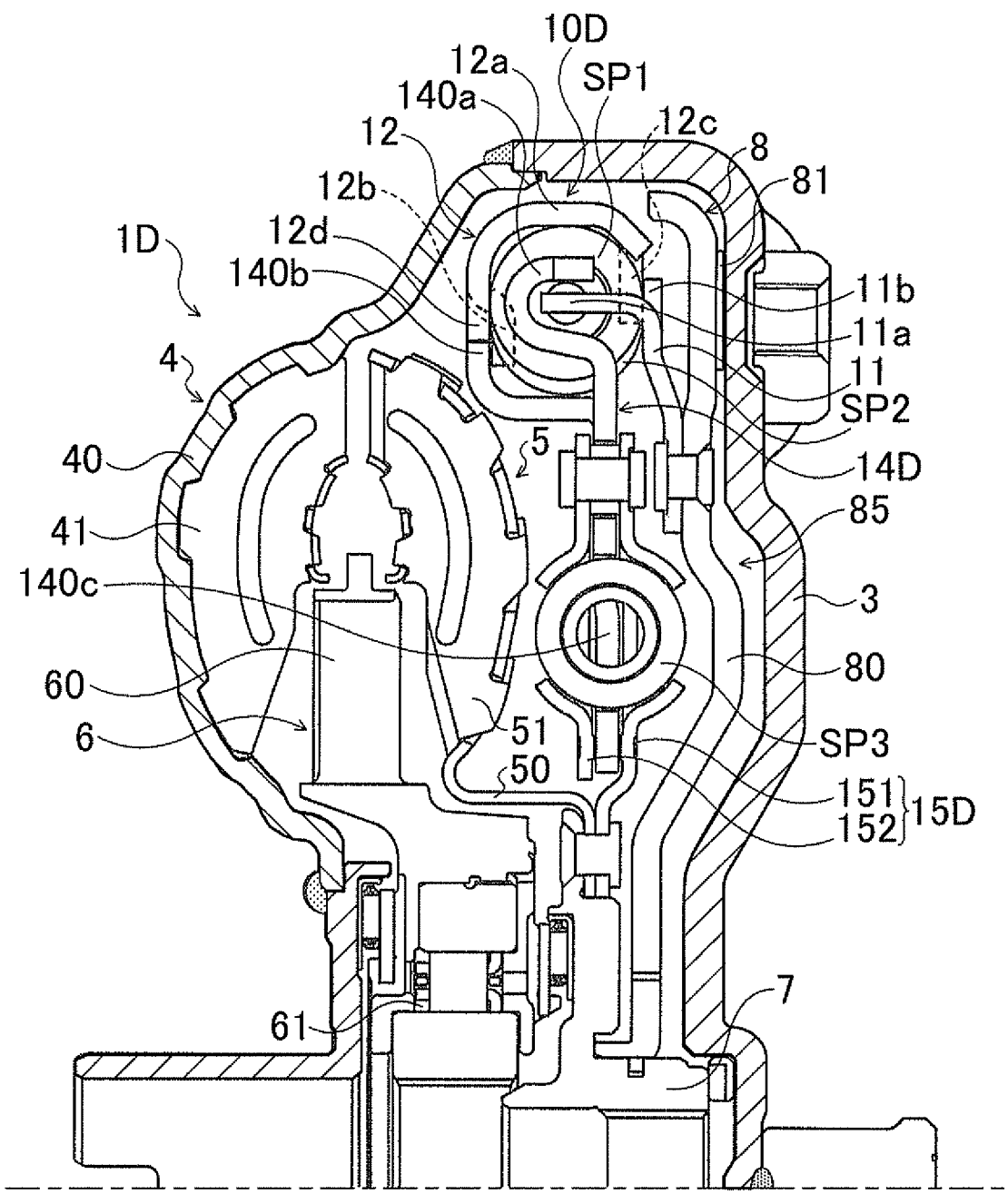
FIG. 9 is a partial cross-sectional view that shows a fluid power transmission apparatus 1D that includes a damper apparatus 10D according to a modification.

FIG. 9 is a partial sectional view showing a fluid power transmission apparatus 1D equipped with a damper apparatus 10D according to a modification. The damper apparatus 10D shown in the drawing includes: a drive member 11 as an input element having a spring contact portion 11a that contacts one end of a first spring SP1; a first intermediate member 12 having a pair of spring contact portions 12b and 12c disposed between and in contact with the first spring SP1 and a second spring SP2, and a plurality of supported portions 12d that slidably contact a second intermediate member 14D; a second intermediate member 14D having a spring contact portion 140a that contacts the other end of the second spring SP2, a plurality of support portions 140b that each slidably contact a corresponding one of supported portions 12d of the first intermediate member 12, and a spring contact portion 140c that contacts one end of a third spring SP3; and a driven member 15D as an output element having a spring contact portion (not shown) that contacts the other end of a third spring SP3.

As shown in FIG. 9, in the damper apparatus 10D according to the modification, the driven member 15D that is an output element is constructed of an annular first plate 151 fixed to a damper hub 7, and an annular second plate 152 fixed to the first plate 151 by a rivet, and the third spring SP3 is slidably supported by the first plate 151 and the second plate 152. Further, in the damper apparatus 10D according to the modification, the second intermediate member 14D is constructed as a single member which has the spring contact portion 140a that contacts the second spring SP2, the plurality of support portions 140b, and the spring contact portion 140c that contacts the third spring SP3, and which is disposed between the first plate 151 and the second plate 152 of the driven member 15D. By constructing the second intermediate member 14D as a single member in this manner, the second intermediate member 14D can be further reduced in weight, and the inertia of the second intermediate member 14D can be even further lessened.

Note that, although the above-described fluid power transmission apparatuses 1 and 1D are each constructed as a torque converter equipped with the pump impeller 4, the turbine runner 5 and the stator 6, a fluid power transmission apparatus that includes a damper apparatus according to the present invention may also be constructed as a fluid coupling that does not have a stator. Besides, the above-described fluid power transmission apparatuses 1 and 1D may also be an apparatus equipped with a multi-plate friction type lockup clutch mechanism instead of the single-plate friction type lockup clutch mechanism 8.

Herein, correspondence relations between major elements of the foregoing embodiments and the like and major elements of the invention described in the section of the summary of the invention will be described. That is, in the foregoing embodiments and the like, the drive member 11 to which power is transferred from the engine as a motor corresponds to an "input element", and the first springs SP1 that are coil springs to which power is transferred from the drive member 11 correspond to a "first elastic body", and the first intermediate member 12 to which power is transferred from the first springs SP1 corresponds to a "first intermediate element", and the second springs SP2 that are coil springs to which power is transferred from the first intermediate member 12 correspond to a "second elastic body", and the second intermediate member 14 to which power is transferred from the second springs SP2 correspond to a "second intermediate element", and the third springs SP3 that are arc springs to which power is transferred from the second intermediate member 14 correspond to a "third elastic body", and the driven member 15 to which power is transferred from the third springs SP3 correspond to an "output element". However, the correspondence relations between major elements according to the embodiments and major elements of the invention described in the section of the summary of the invention are examples for concretely illustrating the aspects of the invention described in the section of the summary of the invention, and therefore do not limit the elements of the invention described in the section of the summary of the invention. That is, the embodiments are merely concrete examples of the invention described in the section of summary of the invention, and the interpretation of the invention described in the summary of the invention should be made on the basis of the descriptions in the section.

While the embodiments of the present invention have been described above, it goes without saying that the present invention is not limited by the foregoing embodiments at all, but can be modified in various manners without departing from the gist of the present invention.

The present invention is applicable in the manufacturing industry of damper apparatuses, etc.

What is claimed is:

1. A damper apparatus comprising:
an input element to which power is transferred from a motor;
a first elastic body to which power is transferred from the input element;
a first intermediate element to which power is transferred from the first elastic body;
a second elastic body to which power is transferred from the first intermediate element;
a second intermediate element to which power is transferred from the second elastic body;
a third elastic body to which power is transferred from the second intermediate element; and
an output element to which power is transferred from the third elastic body, wherein
the first and second elastic bodies are coil springs and are disposed radially outward of the third elastic body, and are disposed adjacent to each other on a single circumference, stiffness of the first elastic body being higher than stiffness of the second elastic body;
the first intermediate element has (i) an annular outer peripheral portion that surrounds the first and second elastic bodies, the annular outer peripheral portion having two peripheral edge portions, the two peripheral edge portions being apart from each other in an axial direction of the annular outer peripheral portion, and (ii) a pair of contact portions, each of the pair of contact portions being formed on each of the peripheral edge portions of the annular outer peripheral portion and extending from each of the peripheral edge portions radially inward and so as to face each other, and the pair of contact portions being disposed between and in contact with the first elastic body and the second elastic body.

2. The damper apparatus according to claim 1, wherein the first intermediate element is rotatably supported by the second intermediate element, and has a plurality of supported portions that are formed on a peripheral edge portion of the outer peripheral portion with an interval left between the supported portions in a circumferential direction so as to protrude from the peripheral edge portion radially inward and that each slidably contact the second intermediate element.

3. The damper apparatus according to claim 2, wherein the second intermediate element has a plurality of support portions that are formed with an interval left between the support portions in a circumferential direction so as to protrude radially outward, and that each slidably contact the first intermediate element.

4. The damper apparatus according to claim 3, wherein:
the input element has a contact portion that contacts one end of the first elastic body;
the contact portion of the first intermediate element contacts the other end of the first elastic body, and also contacts one end of the second elastic body that is adjacent to the first elastic body;
the second intermediate element has a contact portion that contacts the other end of the second elastic body, and a contact portion that contacts one end of the third elastic body; and
the output element has a contact portion that contacts the other end of the third elastic body.

5. The damper apparatus according to claim 4, wherein the second intermediate element is constructed as a single member having the plurality of support portions, the contact portion that contacts the other end of the second elastic body, and the contact portion that contacts the one end of the third elastic body.

6. The damper apparatus according to claim 1, wherein the second intermediate element has a plurality of support portions that are formed with an interval left between the support portions in a circumferential direction so as to protrude radially outward, and that each slidably contact the first intermediate element.

7. The damper apparatus according to claim 6, wherein:
the input element has a contact portion that contacts one end of the first elastic body;
the contact portion of the first intermediate element contacts the other end of the first elastic body, and also contacts one end of the second elastic body that is adjacent to the first elastic body;
the second intermediate element has a contact portion that contacts the other end of the second elastic body, and a contact portion that contacts one end of the third elastic body; and
the output element has a contact portion that contacts the other end of the third elastic body.

8. The damper apparatus according to claim 7, wherein the second intermediate element is constructed as a single member having the plurality of support portions, the contact portion that contacts the other end of the second elastic body, and the contact portion that contacts the one end of the third elastic body.

9. The damper apparatus according to claim 1, wherein stiffness of the third elastic body is lower than the stiffness of the second elastic body.

10. The damper apparatus according to claim 9, wherein the input element is connected, via a lockup clutch, to an input member that is linked to the motor, and the output element is linked to an input shaft of a transmission apparatus.

11. The damper apparatus according to claim 1, wherein the stiffness of the third elastic body is lower than the stiffness of the first elastic body, and higher than or equal to the stiffness of the second elastic body.

12. The damper apparatus according to claim 1, wherein the input element is connected, via a lockup clutch, to an input member that is linked to the motor, and the output element is linked to an input shaft of a transmission apparatus.

* * * * *